United States Patent
Dacey (10) Patent No.: US 6,490,496 B1
(45) Date of Patent: Dec. 3, 2002

(54) METHOD, APPARATUS, AND ARTICLE OF MANUFACTURE FOR A CONTROL SYSTEM IN A SELECTIVE DEPOSITION MODELING SYSTEM

(75) Inventor: Edward J. Dacey, Camarillo, CA (US)

(73) Assignee: 3D Systems, Inc., Valencia, CA (US)

( * ) Notice: Subject to any disclaimer, the term of this patent is extended or adjusted under 35 U.S.C. 154(b) by 0 days.

(21) Appl. No.: 09/257,357

(22) Filed: Feb. 25, 1999

(51) Int. Cl.[7] .............................................. G06F 19/00
(52) U.S. Cl. ...................................... 700/118; 700/119
(58) Field of Search ............................ 700/20, 98, 118, 700/119, 120, 123, 94, 100, 101, 102

(56) References Cited

U.S. PATENT DOCUMENTS

| | | | | |
|---|---|---|---|---|
| 4,896,269 A | * | 1/1990 | Tong | 700/101 |
| 5,197,140 A | * | 3/1993 | Balmer | 711/220 |
| 5,402,350 A | * | 3/1995 | Kline | 700/101 |
| 5,592,654 A | * | 1/1997 | Djakovic | 710/8 |
| 5,786,023 A | * | 7/1998 | Maxwell et al. | 264/40.1 |
| 5,881,284 A | * | 3/1999 | Kubo | 709/100 |
| 5,889,944 A | * | 3/1999 | Butt et al. | 709/203 |
| 5,936,861 A | * | 8/1999 | Jang et al. | 700/98 |
| 5,943,235 A | * | 8/1999 | Earl et al. | 700/98 |
| 6,021,358 A | * | 2/2000 | Sachs | 700/118 |
| 6,155,331 A | * | 12/2000 | Langer et al. | 164/15 |
| 6,162,378 A | * | 12/2000 | Bedal et al. | 264/40.1 |
| 6,175,422 B1 | * | 1/2001 | Penn et al. | 358/1.1 |

FOREIGN PATENT DOCUMENTS

WO    WO 97/19798    6/1997

* cited by examiner

*Primary Examiner*—Maria N. Von Buhr
*Assistant Examiner*—Chad Rapp
(74) *Attorney, Agent, or Firm*—Ted Rittmaster; James E. Curry; Ralph D'Alessandro

(57) ABSTRACT

Techniques for controlling jobs in a selective deposition modeling (Selective Deposition Modeling) system. A client computer system can connect directly to a Selective Deposition Modeling system to work with a job queue located at the Selective Deposition Modeling system. Jobs in the job queue may be previewed in three-dimensional form. Moreover, the jobs in the job queue may be manipulated to move the jobs to different positions in the job queue or to delete a job. Additionally, multiple jobs may be automatically combined to generate a single build process.

62 Claims, 4 Drawing Sheets

METHOD, APPARATUS, AND ARTICLE OF MANUFACTURE FOR A CONTROL SYSTEM IN A SELECTIVE DEPOSITION MODELING SYSTEM

FIELD OF THE INVENTION

This invention relates to techniques for a control system in a selective deposition modeling system used for forming three-dimensional (3D) objects on substantially a layer-by-layer basis with enhanced resolution. The invention more particularly relates to techniques for use in controlling jobs corresponding to three-dimensional objects to be built in a selective deposition modeling system.

BACKGROUND INFORMATION

Rapid Prototyping and Manufacturing (RP&M) is the name given to a field of technologies that can be used to form three-dimensional objects rapidly and automatically from three-dimensional computer data representing the objects. RP&M can be considered to include three classes of technologies: (1) Stereolithography, (2) Laminated Object Manufacturing, and (3) Selective Deposition Modeling.

The stereolithography class of technologies create three-dimensional objects based on the successive formation of layers of a fluid-like medium adjacent to previously formed layers of medium and the selective solidification of those layers according to cross-sectional data representing successiveslices of the three-dimensional object in order to form and adhere laminae. One specific stereolithography technology is known simply as stereolithography and uses a liquid medium which is selectively solidified by exposing it to prescribed stimulation. The liquid medium is typically a photopolymer and the prescribed stimulation is typically visible or ultraviolet electromagnetic radiation. Liquid-based stereolithography is disclosed in various patents, applications, and publications of which a number are briefly described in the Related Applications section hereinafter. Another stereolithography technology is known as Selective Laser Sintering (SLS). SLS is based on the selective solidification of layers of a powdered medium by exposing the layers to infrared electromagnetic radiation to sinter or fuse the particles. SLS is described in U.S. Pat. No. 4,863,538 issued Sep. 5, 1989 to Deckard. A third technology is known as Three-dimensional Printing (3DP). 3DP is based on the selective solidification of layers of a powdered medium which are solidified by the selective deposition of a binder thereon. 3DP is described in U.S. Pat. No. 5,204,055 issued Apr. 20, 1993 to Sachs.

Laminated Object Manufacturing, LOM, techniques involve the formation of three-dimensional objects by the stacking, adhering, and selective cutting of sheets of material, in a selected order, according to the cross-sectional data representing the three-dimensional object to be formed. LOM is described in U.S. Pat. No. 4,752,352 issued Jun. 21, 1988 to Feygin; and U.S. Pat. No. 5,015,312 issued May 14, 1991 to Kinzie, and in PCT Publication No. WO 95-18009 published Jul. 6, 1995 naming Morita as an inventor.

Selective Deposition Modeling, SDM, involves the build-up of three-dimensional objects by selectively depositing solidifiable material on a lamina-by-lamina basis according to cross-sectional data representing slices of the three-dimensional object. One such technique is called Fused Deposition Modeling, FDM, and involves the extrusion of streams of heated, flowable material which solidify as they are dispensed onto the previously formed laminae of the object. FDM is described in U.S. Pat. No. 5,121,329 issued Jun. 9, 1992 to Crump. Another technique is called Ballistic Particle Manufacturing, BPM, which uses a 5-axis, ink-jet dispenser to direct particles of a material onto previously solidified layers of the object. BPM is described in PCT publication numbers WO 96-12607 published May 2, 1996 naming Brown as an inventor; WO 96-12608 published May 2, 1996 naming Brown as an inventor; WO 96-12609 published May 2, 1996 naming Menhennett as an inventor; and WO 96-12610 published May 2, 1996 naming Menhennett as an inventor, all assigned to BPM Technology, Inc. A third technique is called Multijet Modeling and involves the selective deposition of droplets of material from multiple ink jet orifices to speed the building process. Multijet Modeling is described in PCT Publication Nos. WO 97-11835 published Apr. 3, 1997 naming Leyden as an inventor, and WO 97-11837 published Apr. 3, 1997 naming Earl as an inventor (both assigned to 3D Systems, Inc. as is the instant application). A fourth .example is Thermal Stereolithography (TSL) as described in U.S. Pat. No. 5,141,680 issued Aug. 25, 1992 to Almquist et al.

When using Selective Deposition Modeling (as well as other RP&M building techniques), the appropriateness of various methods and apparatus for production of useful objects depends on a number of factors. As these factors cannot typically be optimized simultaneously, a selection of an appropriate building technique and associated method and apparatus involve trade-offs depending on specific needs and circumstances. Some factors to be considered may include 1) equipment cost, 2) operation cost, 3) production speed, 4) object accuracy, 5) object surface finish, 6) material properties of formed objects, 7) anticipated use of objects, 8) availability of secondary processes for obtaining different material properties, 9) ease of use and operator constraints, 10) required or desired operation environment, 11) safety, and 12) post processing time and effort.

In this regard there has been a long existing need to simultaneously optimize as many of these parameters as possible to more effectively build three-dimensional objects. As a first example, there has been a need to enhance object production speed and lower setup time and file preparation time when building objects using a Selective Deposition Modeling technique (SDM) while simultaneously maintaining or reducing the equipment cost. A critical problem in this regard has been the need for an efficient technique for processing jobs corresponding to three-dimensional objects that are stored in a job queue. Another critical problem involves the need for an efficient technique for viewing and modifying the jobs in the job queue.

Accordingly, there is a long-felt but unmet need for methods, apparatus, and articles of manufacture to control jobs corresponding to three-dimensional objects to be built in a Selective Deposition Modeling system to overcome the disadvantages of the prior art.

Though, as noted above, the techniques of the instant invention are directed primarily to selective deposition modeling object formation, it is believed that the techniques may have application in other RP&M technologies.

All patents referred to in this section of the specification are hereby incorporated by reference as if set forth in full.

SUMMARY OF THE DISCLOSURE

Embodiments of the instant invention involve a number of techniques (including methods and apparatus) that can be used alone or in combination to address a number of problems associated with controlling jobs for forming 3D objects by Selective Deposition Modeling. Though primarily directed to Selective Deposition Modeling techniques, the techniques described hereinafter can be applied in a variety of ways to the other RP&M technologies as described above to enhance system throughput by providing enhanced object generation techniques. Furthermore, the techniques described herein can be applied to Selective Deposition Modeling systems that use one or more building and/or support materials wherein one or more of the materials are selectively dispensed, wherein others may be dispensed non-selectively, and wherein elevated temperatures may or may not be used for all or part of the materials to aid in their selective deposition.

The techniques can be applied to Selective Deposition Modeling systems wherein the building material may be a solid made to be melted on a hot plate, which material can be made to solidify after dispensing by causing the removal of the solvent (e.g., by heating the dispensed material, by dispensing the material into a partially evacuated (i.e., vacuum) building chamber, or by simply allowing sufficient time for the solvent to evaporate). Furthermore, various dispensing techniques may be used such as dispensing by single or multiple ink jet devices including hot melt ink jets, bubble jets, etc. and continuous or semi-continuous flow, single or multiple orifice extrusion nozzles or heads.

A first embodiment of the invention involves a method, apparatus, and article of manufacture for enabling a client computer system to connect directly to a Selective Deposition Modeling system.

A second embodiment of the invention involves a method, apparatus, and article of manufacture for previewing jobs that are pending in a job queue at the Selective Deposition Modeling system.

A third embodiment of the invention involves a method, apparatus, and article of manufacture for manipulating jobs that are pending in a job queue at the Selective Deposition Modeling system.

A fourth embodiment of the invention involves a method, apparatus, and article of manufacture for automatically combining multiple jobs into one build process.

It is intended that the above embodiments can be achieved separately by different aspects of the invention and that additional embodiments of the invention will involve various combinations of the above independent embodiments such that synergistic benefits may be obtained from combined techniques.

Other aspects of the invention will be apparent from the description herein.

DESCRIPTION OF THE INVENTION

Figure 1:
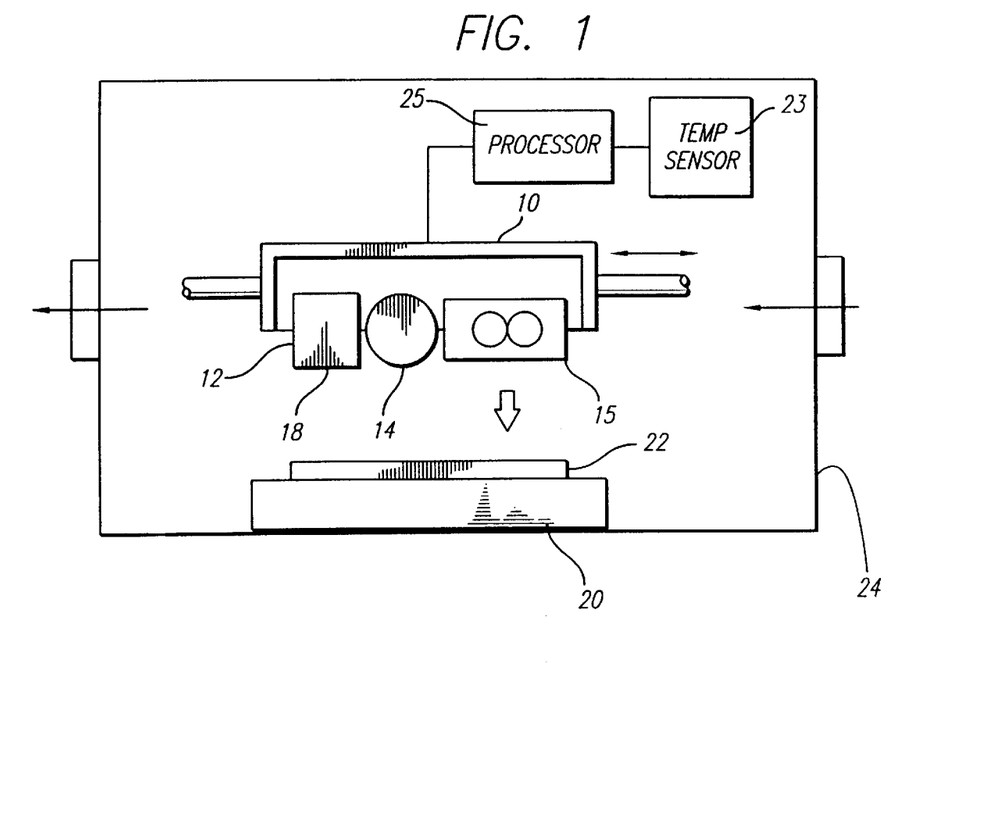
FIG. 1 illustrates a preferred apparatus for performing Selective Deposition Modeling.
Figure 2:
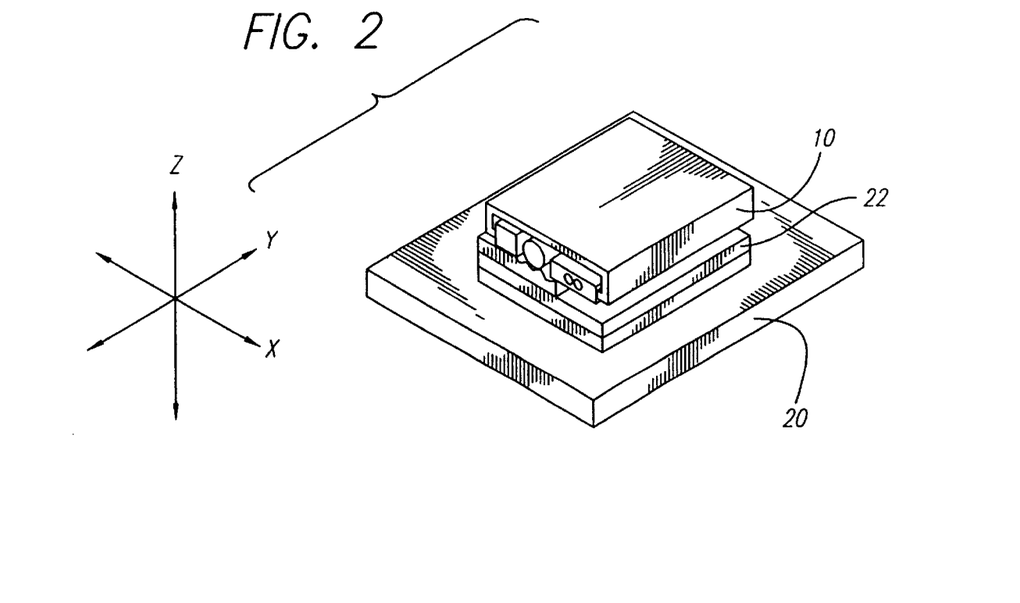
FIG. 2 illustrates another view of a build platform.

As previously discussed, the subject application is directed to control system techniques for controlling jobs in a Selective Deposition Modeling (SDM) system. The detailed description of the invention will begin with a description of a preferred Selective Deposition Modeling system wherein embodiment details will be described as appropriate. A preferred apparatus for performing Selective Deposition Modeling is illustrated in FIGS. 1 and 2. The apparatus comprises a dispensing carriage 10 on which is situated dispensing head 12 (e.g. multi-orifice inkjet head) and planarizer (e.g., a rotating and/or heated roller) 14. The dispensing carriage 10 is supported and drivable back and forth in the X-direction, also known as the main scanning direction, adjacent a build platform 20. The spacing between the head 12 and the dispensing carriage 10 in FIG. 1 is exaggerated for simplifying the present disclosure. In practice the spacing would be small enough to allow the planarizer 14 to contact material deposited on the build platform 20 by the head 12. The motion of the dispensing carriage 10 is under the control or a suitable drive motor and a control computer or microprocessor (not shown).

Furthermore, at either side of the dispensing carriage 10 and/or between the planarizer 14 and dispensing head 12, one or more fans 15 for blowing air vertically down are mounted to help cool the dispensed material and substrate such that the desired building temperature is maintained. Of course other mounting schemes for the fans and/or other cooling systems are possible including the use of misting devices for directing vaporizable liquids (e.g. water, alcohol, or solvents) onto the surface of the object. Cooling systems might involve active or passive techniques for removing heat and may be computer controlled in combination with temperature sensing devices to maintain the dispensed material within the desired building temperature range.

The dispensing head (also referred to as a print head or dispenser) 12 may be for example, a commercial print head configured for jetting color hot melt inks (e.g. thermal plastics or wax-like materials), and modified and/or controlled for use in a three-dimensional modeling system wherein the print head 12 undergoes back and forth movements and accelerations. In one example, the head is a 352 jet multi-color commercial print head produced by Tektronix, Inc. One group of jets comprises four jets 16 which, in a color print head, would represent four colors. Three jets are on the same X-line, and one jet at the end of the sequence of four jets is positioned slightly off of this X-line (i.e., on a different Y-dimension location from the other three jets).

The print head 12 is supplied hot melt material in a flowable state from a reservoir (not shown) for selective jetting from the print head. In a preferred implementation, all 352 jets on the print head 12 are computer controlled to selectively fire droplets when each orifice (i.e., jet) is appropriately located to dispense droplets onto desired locations of a build platform 20. In practice, commands are sent to each jet selectively commanding each one to fire (i.e., dispense a droplet) or not to fire (i.e., not to dispense a droplet) depending on jet position and desired locations for material deposition. Also, in practice, firing commands are preferably sent simultaneously to all jets. Thus, in an embodiment, the head is computer controlled so as to selectively fire the jets, to simultaneously emit droplets of the molten material through one or more jets. Of course it will be appreciated that in alternative embodiments, heads with a different numbers of jets can be used, different firing frequencies are possible and, in appropriate circumstances, non-simultaneous firing of the jets is possible.

The print head 12 defines a pattern of orifices corresponding in number to the number of jets. With respect to FIG. 1, the orifices are directed such that droplets of material are allowed to emit from the underside of the dispensing carriage 10. In an embodiment, the dispensing head 12 (i.e., the array of orifices) is mounted at an angle to the main scanning direction (e.g. X-direction) and is configured with the N=352 individually controllable orifices, arranged in 88 groups of four jets.

Each dispenser (e.g., jet) is equipped with a piezoelectric element which causes a pressure wave to propagate through the material when an electric firing pulse is applied to the element in accordance with well known ink jet head technology. The pressure wave causes a drop of material to be emitted from the orifice. The 352 dispensers are controlled by the control computer which controls the rate and timing of the firing pulses applied to the individual dispenser and therefore the rate and timing of droplets being emitted from the orifices.

One embodiment uses raster scanning to position the print head and orifices to dispense material at desired drop locations. The printing process for each layer is accomplished by a series of relative movements between the head and the desired drop locations on the build platform 20 or previously formed layer. Printing typically occurs as the head relatively moves in a main scanning direction. This is followed by a movement of the build platform 20 in a secondary scanning direction (i.e., Y-direction), while no dispensing occurs. Next, the dispensing carriage 10 moves in a reverse main scanning direction (i.e., opposite X-direction from the direction of movement while dispensing in the previous pass), while dispensing occurs. This is followed by another scan in the main scanning direction in which dispensing again occurs. Alternatively, dispensing may occur in only one X-direction. This process occurs repeatedly until the layer is completely deposited. The procedure is then repeated for each subsequent layer.

Other alternative embodiments may utilize vector scanning techniques or a combination of vector scanning and raster scanning. Other alternative embodiments may use substantially non-perpendicular main and secondary scanning directions along with techniques that result in proper placement of droplets.

In other alternative embodiments prints heads may be used which lay end to end (extend in the secondary scanning direction) and/or which are stacked back to back (stacked in the main scanning direction). When stacked back to back, the print heads may have orifices aligned in the main scanning direction so that they print over the same lines or alternatively they may be offset from one another so as dispense material along different main scanning lines. In particular, it may be desirable to have the back to back print heads offset from each other in the secondary scanning direction by the desired raster line spacing to minimize the number of main scanning passes that must occur. In other alternative embodiments, the data defining deposition locations may not be located by pixels defining a rectangular grid but instead may be located by pixels laid out in some other pattern (e.g. offset or staggered pattern). More particularly, the deposition locations may be fully or partially varied from layer to layer in order to perform partial pixel drop location offsetting for an entire layer or for a portion of a layer based on the particulars of a region to be jetted.

With reference to FIG. 1, planarizer 14 comprises a heated rotating cylinder with a smooth surface. Its function is to melt, transfer, and remove portions of the most recently dispensed layer of material, to smooth it out, to set a desired thickness for the last formed layer, and to set the net upper surface of the last formed layer to a desired level (i.e. the desired working surface or working level for forming a next lamina of the object). Numeral 22 identifies a layer of material which has just been deposited by the print head. The rotating cylinder planarizer 14 is mounted to the dispensing carriage 10 such that it is allowed to project from the underside of the platform by a sufficient amount in the Z-direction such that it contacts material 22 on build platform 20 at a desired level below the orifice plate (the spacing between the planarizer 14 and material 22 is exaggerated in FIG. 1, to more clearly show elements of the system).

The rotation of the planarizer cylinder sweeps material from the just-deposited layer, leaving a smooth surface. The just-deposited material adheres to the smooth, heated surface of the cylinder and is displaced until it contacts a wiper (not shown). The, wiper is disposed of to effectively "scrape" the material from the surface of the cylinder. This material, which is still flowable, is either disposed of or recycled.

With reference to FIG. 1, build platform 20 defines a surface on which is built the three-dimensional object or part layer-by-layer. This platform 20 is preferably supported for movement and driven back and forth in the Y-direction (i.e., index direction or secondary scanning direction) under computer control. The build platform 20 also is supported for movement and is driven up and down (typically progressively downward during the build process) in the Z-direction under computer control.

To build a cross-section of a part, the build platform 20 moves in the Z-direction relative to the print head 12, such that the last-built (i.e., dispensed and possibly planed) layer of the part is situated an appropriate amount below the orifice plate 18 of the print head 12. The print head 12 is moved one or more times over the XY build region (the head sweeps back and forth in the X direction, while the Y-stage translates the partially formed object in the Y-direction). The combination of the last formed layer of the object and any supports associated therewith define the working surface for deposition of the next lamina and any supports associated therewith. During translation in the XY directions, the jets of the print head are fired in a registered manner with previously dispensed layers to deposit material in a desired pattern and sequence for the building of the next lamina of the object. During the dispensing process, a portion of the dispensed material is removed by the planarizer in the manner discussed above. The X, Y, and Z movements, dispensing, and planarizing are repeated to build up the object from a plurality of selectively dispensed and adhered layers. In an alternative embodiment, the step of planarization could be performed independently of the dispensing steps. In other alternative embodiments, the planarizer may not be used on all layers but instead may be used on selected or periodic layers.

As noted previously, in a preferred aspect, the print head is directed to trace a raster pattern. The raster pattern consists of a series of raster lines, R(1), R(2), . . . , R(N), running in the X-direction or main scanning direction and arrayed along the Y-direction (i.e. index direction or secondary scanning direction). The raster lines are spaced from one another by a distance $d_r$, which, in an embodiment, is $\frac{1}{300}$ inches (about 3.3 mils or about 83.8 $\mu$m).

This is accomplished by following a two-step process. The first step includes alternating main scanning direction passes with secondary scanning direction movements of an amount equal to the desired raster line resolution until all raster lines between initial lines dispensed by two adjacent jets are scanned. Thereafter, a second step includes making a large index direction increment. The first and second steps are repeated until the indexing direction increments, and lines scanned, are sufficient to deposit material on all raster lines required to form the object layer or cross-section (including any necessary supports for forming subsequent cross-sections).

The firing of the ink jet orifices is controlled by a rectangular bit map maintained in a control computer or other memory device. The bit map consists of a grid of memory cells, in which each memory cell corresponds to a pixel of the working surface, and in which the rows of the grid extend in the main scanning direction (X-direction) and the columns of the grid extend in the secondary scanning direction (Y-direction). The width of (or distance between) the rows (spacing along the Y-direction) may be different from the width (or length of or distance between) of the columns (spacing along the X-direction) dictating that different data resolutions may exist along the X and Y directions. In alternative embodiments, non-uniform pixel size is possible within a layer or between layers wherein one or both of the pixel width or length is varied by pixel position. In other alternatives., other pixel alignment patterns are possible. For example, pixels on adjacent rows may be offset in the main scanning direction by a fractional amount of the spacing between pixels in the main scanning direction so that their center points do not align with the center points of the pixels in the neighboring rows. This fractional amount may be ½ so that their center points are aligned with the pixel boundaries of adjacent rows. It may be ⅓ or some other amount such that two or more intermediate rows of pixels are located between rows where pixels are realigned in the main scanning direction. In further alternatives, pixel alignment might be dependent on the geometry of the object or support structure being dispensed. For example, it might be desirable to shift pixel alignment when forming a portion of a support pattern that is supposed to bridge a gap between support columns. These and other alternative pixel alignment schemes can be implemented by modifying the pixel configuration or alternatively defining a higher resolution pixel arrangement (in X and/or Y) and using pixel firing patterns that do not fire on every pixel location but instead fire on selected spaced pixel locations which may vary according to a desired random, predetermined, or object basis pattern.

The data resolution in the main scanning direction may be defined in terms of Main Direction Pixels (MDPs). MDPs may be described in terms of pixel length or in terms of number of pixels per unit length. In one embodiment MDP= 300 pixels per inch (26.67 mils/pixel or 677.4 μm/pixel). In other embodiments MDP=1200 pixels per inch. Similarly the data resolution in the secondary scanning direction may be defined in terms of Secondary Direction Pixels (SDPs) and the SDPs may be described in terms of pixel width or in terms of number of pixels per unit length. In one embodiment SDP=MDP=300 pixels per inch (26.67 mils/pixel or 677.4 μm/pixel). The SDP may or may not be equivalent to spacing between raster lines and the MDP may or may not be equivalent to the spacing between successive drop locations along each raster line. The spacing between successive raster lines may be defined as Secondary Drop Locations (SDLs), while spacing between successive drop locations along each raster line may be defined as Main Drop Locations (MDLs). Similar to SDPs and MDPs, SDLs and MDLs may be defined in terms of drops per unit length or drop spacing.

If SDP=SDL, there is a one to one correspondence between data and drop locations along the secondary scanning direction and the pixel spacing is equal to that of the raster line spacing. If MDP=MDL, there is a one to one correspondence between data and drop locations along the main scanning direction.

If SDL and/or MDL is larger than SDP and MDP, respectively, more drops will need to be fired than that for which data exists, thus each pixel will need to be used in causing more than one droplet to be dispensed. The dispensing of these extra droplets can be done in one of two ways either by dispensing the droplets at intermediate points between the centers of successive pixels (i.e. intermediate dropping, "ID") or alternatively directly on top of pixel centers (i.e. direct dropping, "DD"). In either case this technique is called "overprinting" and results in faster build up of material and eases mechanical design constraints involving maximum scan speeds and acceleration rates since the same Z-build up can occur while moving the print head and/or object more slowly.

If SDL and/or MDL is less than SDP and/or MDP, respectfully, drops will be fired at fewer locations than those for which data exists, at least for a given pass of the print head. This data situation may be used to implement the offset pixel and/or non-uniform sized pixel techniques discussed above.

To build a cross-section, the bit map is first loaded with data representative of the desired cross-section (as well as any supports which are desired to be built). Assuming, as with this embodiment, a single build and support material is being used, if it is desired to deposit material at a given pixel location, then the memory cell corresponding to that location is appropriately flagged (e.g. loaded with a binary "1") and if no material is to be deposited an opposite flag is used (e.g. a binary "0"). If multiple materials are used, cells corresponding to deposition sites are flagged appropriately to indicate not only drop location sites but also the material type to be deposited. For ease of data handling, compressed data defining an object or support region (e.g. on-off location points along each raster line) can be booleaned with a fill pattern description to be used for the particular region to derive a final bit map representation used for firing the dispensing jets. The raster lines making up the grid are then assigned to individual orifices in the manner described earlier. Then, a particular orifice is directed to fire or not over a pixel depending on how the corresponding cell in the bit map is flagged.

Client and Selective Deposition Modeling Connection

Figure 3:
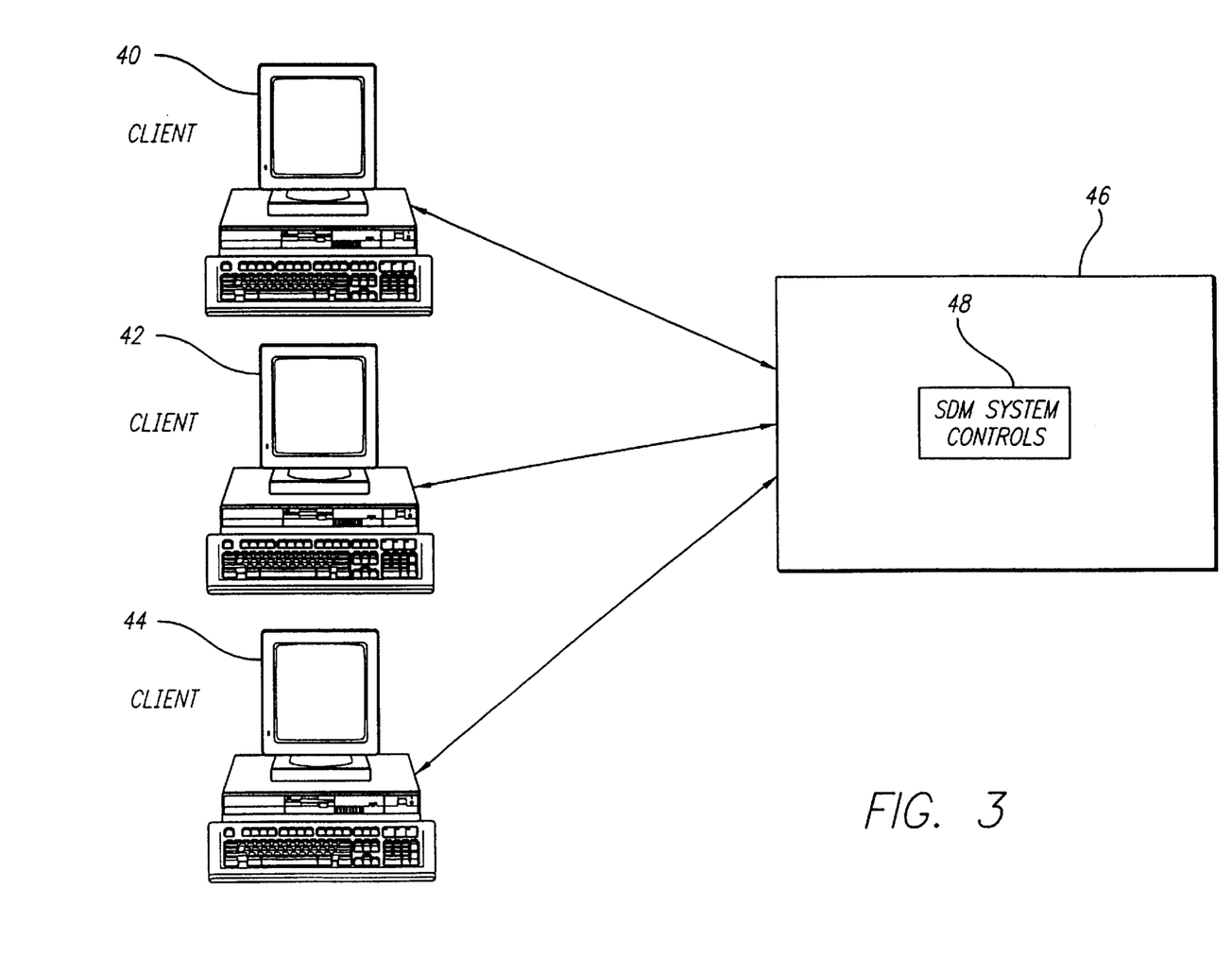
FIG. 3 illustrates a preferred apparatus for communication between multiple client computers and a Selective Deposition Modeling system.

FIG. 3 illustrates a preferred apparats for communication between multiple client computers and a Selective Deposition Modeling system, Clients (i.e., client computers) 40, 42, and 44 are connected to the Selective Deposition Modeling system 46 via a network 50. Conventional systems typically require that a client computer connect to a printer server, which stores a job queue of jobs and transmits the jobs to a modeling system. According to one embodiment of the invention, the job queue functions are implemented in a Selective Deposition Modeling system 48, which enables users to connect directly to the Selective Deposition Modeling system 48 via client computers 40, 42, and 44 to submit jobs to the job queue, to preview the job queue, and to manipulate the job queue.

The client computers 40, 42, and 44 generally include, inter alia, a processor, random access memory (RAM), data storage devices (e.g., hard, floppy, and/or CD-ROM disk drives, etc.), data communications devices (e.g., modems, network interfaces, etc.), a monitor (e.g., CRT, LCD display, etc.), a mouse pointing device, and a keyboard. It is envisioned that attached to the client computers 40, 42, and 44 may be other devices such as read only memory (ROM), a video card, bus interface, printers, etc. Those skilled in the art will recognize that any combination of the above components, or any number of different components, peripherals, and other devices, may be used with the client computers 40, 42, and 44.

The Selective Deposition Modeling system 46 generally includes, inter alia, a processor, random access memory (RAM), data storage devices (e.g. hard, floppy, and/or CD-ROM disk drives, etc.), and data communications devices (e.g., modems, network interfaces, etc.). It is envisioned that attached to the Selective Deposition Modeling system 46 may be other devices, such as a monitor, a mouse, and a keyboard. Those skilled in the art will recognize that any combination of the above components, or any number of different components, peripherals, and other devices, may be used with the Selective Deposition Modeling system 46.

The client computers 40, 42, and 44 and the Selective Deposition Modeling system 46 operate under the control of an operating system (OS). The operating system controls the execution of one or more computer programs at the client computers 40, 42, and 44 and Selective Deposition Modeling system 46. The present invention is generally implemented in these computer programs.

The operating systems and computer programs are comprised of instructions which, when read and executed by the client computers 40, 42, and 44 and Selective Deposition Modeling system 46, cause the client computers 40, 42, and 44 and Selective Deposition Modeling system 46 to perform the steps necessary to implement and/or use the present invention.

Thus, embodiments of the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 3 is not intended to limit the present invention. Indeed, those skilled in the art will recognize that other alternative hardware environments may be used without departing from the scope of the present invention.

In particular, the Selective Deposition Modeling system 46 contains Selective Deposition Modeling system controls 48 of the present invention. In a preferred aspect of the invention, the client computers 40, 42, and 44 are able to communicate directly with the Selective Deposition Modeling system 46 and provide commands to the Selective Deposition Modeling system controls 48.

The client computers 40, 42, and 44 provide commands for building three-dimensional parts or objects. As discussed above, the firing of the ink jet orifices is controlled by a cross-section comprised of a rectangular bit map maintained in a control computer or other memory device. Each client computer 40, 42, and 44 is able to create the cross-sectional bit maps used to build three-dimensional objects, layer by layer (with each cross-section corresponding to a layer). The client computers 40, 42, and 44 transmit the bit maps to the Selective Deposition Modeling system 46.

Each of the client computers 40, 42, and 44 maintains a local job queue. Each job has a job representing the object to be built. The Selective Deposition Modeling system 46 is unaware of the client computers' 40, 42, and 44 local job queues. The client computers 40, 42, and 44 are able to create a single job for multiple objects, for example a globe and a cube, as long as the objects fit on the build platform. Additionally, in one embodiment, overlap of the objects may be tolerated if, for example, the objects can be separated by supports. The client computers 40, 42, and 44 can store jobs in their local job queues and transmit commands to the Selective Deposition Modeling system 46 to have these jobs entered into the job queue controlled by the Selective Deposition Modeling system controls 48.

The Selective Deposition Modeling system controls 48 provide controls for, among other things, managing the job queue. The job queue is stored and maintained by the Selective Deposition Modeling system controls 48. The job queue has a "head", which is the front of the job queue, and a "bottom", which is the rear of the job queue. When the Selective Deposition Modeling system controls 48 receive a command to build an object, the Selective Deposition Modeling system controls 48 add a job representing that object to the "bottom" of the job queue. However, in alternative embodiments, the jobs could be stored into the job queue based on a priority scheme, such as an urgency level associated with each job, size of each job, source of each job, other factors suitable for defining a priority order, or combinations of such factors.

The job queue contains jobs at different stages of being built. Some jobs are pending processing. These are jobs that have been added to the job queue, without further processing. The job queue also contains jobs that are being prepared. These are jobs that are selected for pre-processing, for example, while another object is being built on the build platform or during initialization of the system. The job queue also contains jobs that are being built. These are jobs that are being built on the build platform. The term "build" refers to a job that is about to be built. As will be discussed below, one "build" can comprise multiple jobs.

Previewing Jobs

The Selective Deposition Modeling system controls enable a user at a client computer to preview all of the jobs in the job queue. Whether or not a user at the client computer submitted a particular job, the user could preview the job. In an alternative embodiment, a particular user (e.g., an administrator) or client computer may be designated to be the only one with access to previewing all jobs. In another embodiment, a user may only preview jobs that the user submitted.

Conventional systems typically only provide a list of the jobs, without providing a three-dimensional rendering. On the other hand, an embodiment of the invention provides a list of the jobs and/or images of the jobs and enables a user to select a job for previewing, by, for example, using a mouse to "click" on the job in the list or on an image of a job. In further embodiments, other suitable user interfaces may be used as an alternative to a mouse, including, but not limited to other forms of cursor control, such as touch screen, keyboard, or the like.

To preview a job, the client computer sends a request to the Selective Deposition Modeling system 46 to preview jobs in the job queue. In response, the Selective Deposition Modeling system 46 provides the client computer with a list of jobs in the job queue. The client computer then provides the Selective Deposition Modeling system 46 with data identifying a job in the list selected by a user. The Selective Deposition Modeling system controls 48 prepare the data in the job queue to be displayed on a monitor at the client computer in three-dimensional form. The Selective Deposition Modeling system controls 48 may use the bitmap associated with a job to provide this preview. The Selective Deposition Modeling system controls 48 transmit the data to the client computer. The data is displayed at the client computer for use by a user. The data displayed shows the object as it will be rendered by the Selective Deposition Modeling system 46. Additionally, if multiple objects from different jobs are combined, as will be discussed below, the Selective Deposition Modeling system controls 48 shows the combination of objects as they will be rendered.

Figure 4:
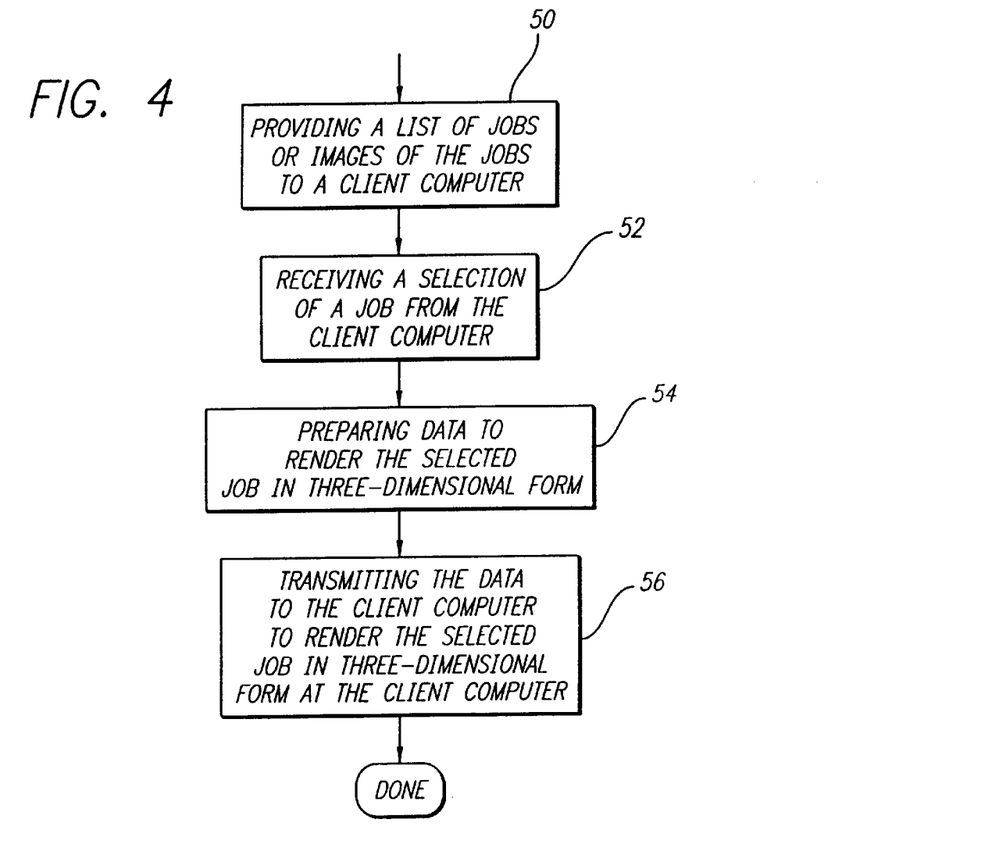
FIG. 4 is a flow diagram illustrating steps performed by the Selective Deposition Modeling system controls to enable previewing of a job.

FIG. 4 is a flow diagram illustrating steps performed by the Selective Deposition Modeling system controls 48 to enable previewing of a job. The Selective Deposition Modeling system controls 48 provide a list of jobs or images of the jobs to a client computer, as represented by Block 50, for example, in response to a request for such a list from the client computer. The Selective Deposition Modeling system controls 48 receive a selection of a job from the client computer, as represented by Block 52. The Selective Deposition Modeling system controls 48 prepare data to render the selected job in three-dimensional form, as illustrated by Block 54. Then, the Selective Deposition Modeling system controls 48 transmit the data to the client computer to render the selected job in three-dimensional form at the client computer, as represented by Block 56.

Manipulating Jobs

Figure 5:
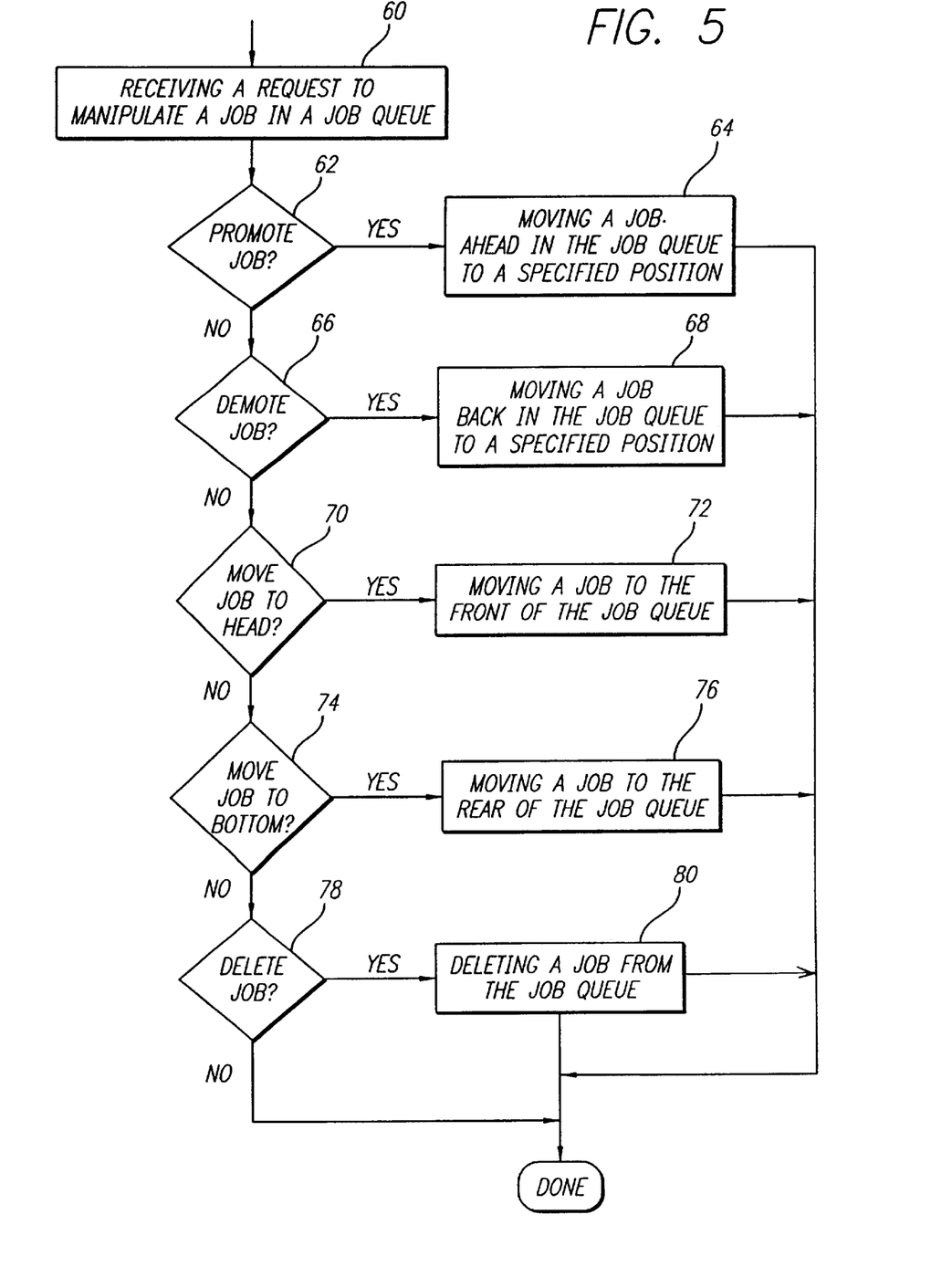
FIG. 5 is a flow diagram illustrating steps performed by the Selective Deposition Modeling system controls to enable manipulation of a job.

The Selective Deposition Modeling system controls 48 enable users at client computers to manipulate a pending job in the job queue. In particular, the Selective Deposition Modeling system controls 48 enable a user to promote a job in the job queue to a specified position. Jobs are stored at the "bottom" of the job queue, and move up in the job queue as jobs ahead of them are processed. In one embodiment, the jobs are processed in FIFO (first in, first out) order, however, as will be discussed below, in other embodiments the jobs are not processed in FIFO order. By promoting a job in the job queue, a user is able to ensure the job is processed before jobs that are stored ahead of the promoted job when jobs are selected for processing from the head of the job queue. On the other hand, the Selective Deposition Modeling system controls 48 also enable a user to demote a job to a specified position, ensuring that the job is processed after jobs that are stored behind the demoted job when jobs are selected for processing from the head of the job queue. Additionally, the Selective Deposition Modeling system controls 48 enable a user to send a job to the head of the job queue or to the bottom of the job queue. Moreover, the Selective Deposition Modeling system controls 48 enable a user to delete a job.

A user at a client computer manipulates the job queue stored at the Selective Deposition Modeling system 46. In one embodiment, the Selective Deposition Modeling system controls 48 enable any user to manipulate the job queue. In an alternative embodiment, only a designated user (e.g., a system administrator) is allowed to manipulate the job queue.

FIG. 5 is a flow diagram illustrating steps performed by the Selective Deposition Modeling system controls 48 to enable manipulation of a job. As represented by Block 60, the Selective Deposition Modeling system controls 48 receive a request to manipulate a job in a job queue. If the request is to promote a job, as represented by Block 62, the Selective Deposition Modeling system controls 48 move the job ahead in the queue to a specified position, as represented by Block 64. If the request is to demote a job, as represented by Block 66, the Selective Deposition Modeling system controls 48 move the job back in the queue to a specified position, as represented by Block 68. If the request is to move a job to the "head", as represented by Block 70, the Selective Deposition Modeling system controls 48 move the job to the front of the queue, as represented by Block 72. If the request is to move a job to the "bottom", as represented by Block 74, the Selective Deposition Modeling system controls 48 move the job to the rear of the queue, as represented by Block 76. If the request is to delete a job, as represented by Block 78, the Selective Deposition Modeling system controls 48 delete the job from the queue, as represented by Block 80.

Combining Multiple Jobs into One Build Process

Figure 6:
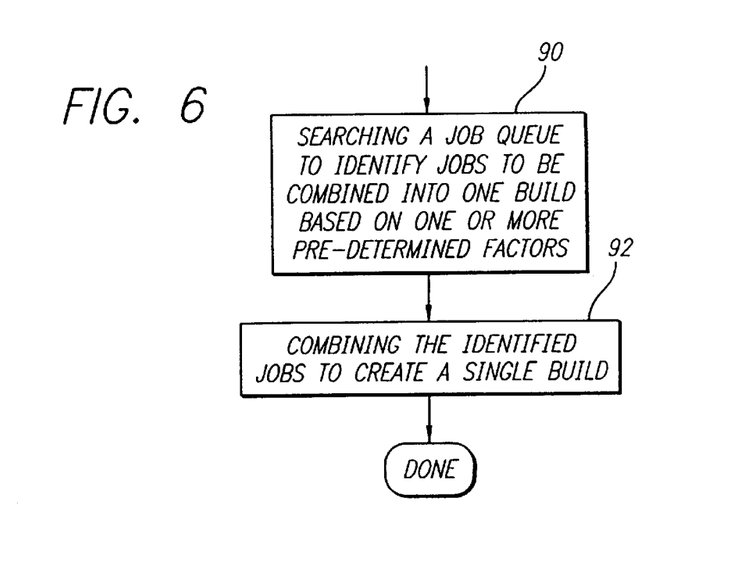
FIG. 6 is a flow diagram illustrating steps performed by the Selective Deposition Modeling system controls to enable combining multiple jobs to generate a single build.

The Selective Deposition Modeling system controls 48 automatically combine multiple jobs in a job queue into one build process. That is, the objects corresponding to the combined jobs are built at the same time on the build platform. In particular, the Selective Deposition Modeling system controls 48 stores jobs at the "bottom" of a job queue. However, the Selective Deposition Modeling system controls 48 may process the jobs in the order that they are received or some other order. Near the completion of building a job, the Selective Deposition Modeling system controls 48 look at the job queue to determine which job or jobs to process next. Typically, the Selective Deposition Modeling system controls 48 will prepare a job to be built while another job is being completed.

One of the reasons to combine jobs is to more efficiently process the jobs. The most costly factor is a Z-dimension (i.e., height), while the least costly is the Y-dimension (i.e., size of the build platform). Thus, it is useful to combine multiple objects for processing to use as much of the build platform as possible for each build process. Also, as discussed below, it is useful to combine objects based on height.

When determining which job or jobs to process next, the Selective Deposition Modeling system controls 48 will search the job queue to identify jobs that can be combined and built at the same time. The jobs that can be combined must all completely fit on the build platform. Additionally, in one embodiment, overlap in a direction (e.g., the Z-dimension) may be tolerated, if, for example, the objects can be separated by supports. The combination of jobs becomes the next build process.

There are three elements that prevent the Selective Deposition Modeling system controls 48 from combining jobs. First, a user can submit a job from a client computer with an indication (e.g., flag or condition) that the job is not to be combined. A user may do this so that, for example, a short object of theirs is not combined with a large object, which would delay completion of the building of the short object. If the Selective Deposition Modeling system controls 48 encounter a job with such an indication, the Selective Deposition Modeling system controls do not combine that job with any other. Second, if the job queue only contains one job, the Selective Deposition Modeling system controls 48 process that job without attempting to combine the job. In an alternative embodiment, the Selective Deposition Modeling system controls 48 could defer processing the single job in the job queue and wait for other jobs to be entered into the job queue to attempt to combine jobs. Third, if the build platform is full (with one large job or a group of jobs that have been combined already), the Selective Deposition Modeling system controls 48 do not attempt to combine that large job or group of jobs with any other jobs pending in the job queue.

There are multiple alternative techniques for combining jobs. In one embodiment of the invention, the first job in the job queue is selected, and then the job queue is searched for jobs that can be combined with the selected job. In another embodiment, the best set of objects corresponding to jobs in the job queue are combined, without regard to their position in the job queue (i.e., first, second, etc.). In yet another embodiment, a common attribute may be used to combine jobs. For example, the height of objects for the jobs may be used to select jobs to be combined (e.g., all short objects are combined into one build process). If just short objects were selected for combination all of the time, there is a possibility that a tall object may never be selected to be built. Thus, an alternative embodiment is to select jobs in increasing order of the characteristic, such as height (e.g., first select jobs of height 1 inch or less, then select jobs of height 1.25 inches or less, etc.). Another embodiment of the invention marks a job as "skipped n times" (where n=one, two, etc.) to indicate that the job was skipped "n" times and should not be skipped again. This would ensure that the processing for a job at the head of the job queue would not be delayed to process jobs that were added to the job queue after that job. That is, jobs in the job queue could be moved forward with the combination process without delaying the processing of other jobs in the job queue.

Thus the Selective Deposition Modeling system controls 48 review the job queue, determine which jobs are combinable, and determine which jobs cannot be combined at all. FIG. 6 is a flow diagram illustrating steps performed by the Selective Deposition Modeling system controls 48 to enable combining multiple jobs to generate a single build. The Selective Deposition Modeling system controls 48 search the job queue to identify jobs to be combined into one build based on one or more pre-determined factors, as represented by Block 90. Then, the Selective Deposition Modeling system controls 48 combine the identified jobs to create a single build.

Conclusion

While embodiments and applications of this invention have been shown and described, it should be apparent to those skilled in the art that many more modifications are possible without departing from the inventive concepts herein. The invention, therefore, is not to be restricted, except in the spirit of the appended claims.

What is claimed is:

1. A rapid prototyping system, comprising:
   at least one rapid prototyping apparatus;
   at least one client computer in communication with the rapid prototyping apparatus;
   means for receiving jobs from the client computer and for combining at least two jobs in one build process, each job corresponding to a three-dimensional object to be built; and
   means for performing the build process to form the three-dimensional objects corresponding to the combined jobs.

2. The system of claim 1, wherein the rapid prototyping apparatus is selected from the group consisting of a selective deposition modeling apparatus, a stereolithography apparatus, a laminated object manufacturing apparatus, and a laser sintering apparatus.

3. The system of claim 1, further comprising means for maintaining a job queue for holding the jobs when received from the client computer.

4. The system of claim 3, further comprising means for determining which jobs can be combined to form their corresponding three-dimensional object in one build process.

5. The system of claim 3 wherein the job queue resides with the rapid prototyping apparatus.

6. The system of claim 1 wherein the client computer is directly connected to the rapid prototyping apparatus.

7. A method of creating three-dimensional objects in a rapid prototyping system, the method comprising the steps of:
   connecting at least one client computer to at least one rapid prototyping apparatus;
   receiving jobs from the client computer, each job corresponding to a three-dimensional object to be built;
   combining at least two jobs into one build process; and
   performing the build process by the rapid prototyping apparatus to form the three-dimensional objects corresponding to the combined jobs.

8. The method of claim 7, wherein the rapid prototyping apparatus is selected from the group consisting of a selective deposition modeling apparatus, a stereolithography apparatus, a laminated object manufacturing apparatus, and a laser sintering apparatus.

9. The method of claim 7, further comprising the step of maintaining a job queue for holding the jobs when received from the client computer.

10. The method of claim 9, further comprising the step of determining which jobs can be combined to form their corresponding three-dimensional objects in one build process.

11. The method of claim 10 wherein the jobs are combined into the one build process according to a common attribute of the jobs.

12. The method of claim 11, wherein the common attribute is the height of the three-dimensional object associated with the job.

13. The method of claim 7 further comprising the step of providing an option for a user to identify a job that is not to be combined with other jobs.

14. An article of manufacture comprising a computer program carrier readable by a computer and embodying one or more instructions executable by the computer to perform method steps for creating a three-dimensional object in a rapid prototyping system having at least one rapid prototyping apparatus, the method comprising the steps of:
   connecting at least one client computer to the rapid prototyping system;
   receiving jobs from the client computer, each job corresponding to a three-dimensional object to be built;
   combining at least two jobs into one build process; and
   performing the build process by the rapid prototyping apparatus to form the three-dimensional objects corresponding to the combined jobs.

15. The article of manufacture of claim 14, wherein the rapid prototyping apparatus is selected from the group consisting of a selective deposition modeling apparatus, a stereolithography apparatus, a laminated object manufacturing apparatus, and a laser sintering apparatus.

16. The article of manufacture of claim 14, further comprising the step of maintaining a job queue for holding the jobs when received from the client computer.

17. The article of manufacture of claim 16, further comprising the step of determining which jobs can be combined to form their corresponding three-dimensional objects in one build process.

18. The article of manufacture of claim 17 wherein the jobs are combined into the one build process according to a common attribute of the jobs.

19. The article of manufacture of claim 14 further comprising the step of providing an option for a user to identify a job that is not to be combined with other jobs.

20. A rapid prototyping system, comprising:
at least one rapid prototyping apparatus;
at least one client computer in communication with the rapid prototyping apparatus;
means for accepting multiple jobs from the client computer to be placed in a job queue, wherein each job comprises a request to build a three-dimensional object; and
means for previewing a three-dimensional object corresponding to a job in the job queue, the object being previewed in three-dimensional form at the client computer as the three-dimensional object will be rendered by the rapid prototyping apparatus while the job is in the job queue.

21. The system of claim 20 further comprising:
means for providing a list of jobs in the job queue to the client computer; and
means for selecting the job to be previewed by the client computer.

22. The system of claim 20 wherein the client computer is directly connected to the rapid prototyping apparatus.

23. The system of claim 20 wherein the job queue resides with the rapid prototyping apparatus.

24. A rapid prototyping system of claim 20 further comprising:
means for combining at least two jobs into one build process; and
wherein the means for previewing a three-dimensional object corresponding to a job in the job queue previews all three-dimensional objects combined into the one build process as they will he rendered by the rapid prototyping apparatus.

25. A method of creating a three-dimensional object in a rapid prototyping system, the method comprising the steps of:
accepting multiple jobs to be placed in a job queue from at least one client computer, wherein each job comprises a request to build a three-dimensional object by a rapid prototyping apparatus; and
previewing a three-dimensional object corresponding to a job in the job queue, the object being previewed in three-dimensional form at the client computer as the three-dimensional object will be rendered by the rapid prototyping apparatus while the job is in the job queue.

26. The method of claim 25, further comprising the steps of:
providing a list of jobs in the job queue to the client computer; and
selecting a job to be previewed by the client computer.

27. A method of claim 25 further comprising:
combining at least two jobs into one build process; and
wherein the step of previewing a three-dimensional object corresponding to a job in the job queue previews all three-dimensional objects combined into the one build process as they will be rendered by the rapid prototyping apparatus.

28. The method of claim 25 further comprising the step of combining at least two jobs into one build process wherein the three-dimensional objects associated with the combined jobs can be previewed in three-dimensional form at the client computer.

29. A rapid prototyping system, comprising:
means for accepting multiple jobs to be placed in a job queue, wherein each job comprises a request to build a three-dimensional object by a rapid prototyping apparatus; and
means for manipulating the jobs to combine at least two jobs into one build process performed by the rapid prototyping apparatus.

30. The system of claim 29, wherein the means for manipulating further comprises means for promoting a said job in the job queue.

31. The system of claim 29, wherein the means for manipulating further comprises means for demoting a said job in the job queue.

32. The system of claim 29, wherein the means for manipulating further comprises means for moving a said job to a head of the job queue.

33. The system of claim 29, wherein the means for manipulating further comprises means for moving a said job to a bottom of the job queue.

34. The system of claim 29, wherein the means for manipulating further comprises means for deleting a said job in the job queue.

35. The system of claim 29, wherein the means for manipulating further comprises means for receiving a command from a client computer to manipulate a said job in the job queue.

36. A method of creating a three-dimensional object in a rapid prototyping system, the method comprising the steps of:
accepting multiple jobs to be placed in a job queue, wherein each job comprises a request to build a three-dimensional object by a rapid prototyping apparatus; and
manipulating the jobs to combine at least two jobs into one build process performed by the rapid prototyping apparatus.

37. The method of claim 36, wherein the step of manipulating further comprises the step of promoting a job in the job queue.

38. The method of claim 36, wherein the step of manipulating further comprises the step of demoting a job in the job queue.

39. The method of claim 36, wherein the step of manipulating further comprises the step of moving a job to a head of the job queue.

40. The method of claim 36, wherein the step of manipulating further comprises the step of moving a job to a bottom of the job queue.

41. The method of claim 36, wherein the step of manipulating further comprises the step of deleting a job in the job queue.

42. A rapid prototyping system, comprising:
means for accepting multiple jobs to be placed in a job queue, wherein each job comprises a request to build a three-dimensional object by at least one rapid prototyping apparatus; and
means for combining two or more jobs in one build process performed by the rapid prototyping apparatus.

43. The system of claim 42, further comprising means for identifying jobs in the job queue to be combined.

44. The system of claim 43, further comprising means for identifying that a said job is marked as not combinable.

45. The system of claim 43, further comprising means for identifying that a particular combination of jobs would result in objects corresponding to the jobs overlapping.

46. The system of claim 43, further comprising means for identifying that a combination of jobs fills a build platform.

47. Th system of claim 42, wherein the means for combining two or more jobs into one build process further comprises means for combining jobs by maximizing a Z-dimension.

48. The system of claim 42, wherein the means for combining two or more jobs into one build process further comprises means for combining jobs by maximizing a Y-dimension.

49. A method of creating a three-dimensional object in a rapid prototyping system, the method comprising the steps of:

accepting multiple jobs to be placed in a job queue, wherein each job comprises a request to build a three-dimensional object; and generating a build by combining two or more jobs in the job queue.

50. The method of claim 49, further comprising the step of identifying jobs in the job queue to be combined.

51. The method of claim 50, further comprising the step of identifying that a job is marked as not combinable.

52. The method of claim 50, further comprising the step of identifying that a particular combination of jobs would result in objects corresponding to the jobs overlapping.

53. The method of claim 50, further comprising the step of identifying that a combination of jobs fills a build platform.

54. The method of claim 49, wherein the step of generating a build further comprises the step of combining jobs by maximizing a Z-dimension.

55. The method of claim 49, wherein the step of generating a build further comprises the step of combining jobs by maximizing a Y-dimension.

56. An article of manufacture comprising a computer program carrier readable by a computer and embodying one or more instructions executable by the computer to perform method steps for creating a three-dimensional object in a rapid prototyping system, the method comprising the steps of:

accepting multiple jobs to be placed in a job queue, wherein each job comprises a request to build a three-dimensional object; and generating a build by combining two or more jobs in the job queue.

57. The article of manufacture of claim 56, further comprising the step of identifying jobs in the job queue to be combined.

58. The article of manufacture of claim 57, further comprising the step of identifying that a job is marked as not combinable.

59. The article of manufacture of claim 57, further comprising the step of identifying that a particular combination of jobs would result in objects corresponding to the jobs overlapping.

60. The article of manufacture of claim 59, further comprising the step of identifying that a combination of jobs fills a build platform.

61. The article of manufacture of claim 56, wherein the step of generating a build further comprises the step of combining jobs by maximizing a Z-dimension.

62. The article of manufacture of claim 56, wherein the step of generating a build further comprises the step of combining jobs by maximizing a Y-dimension.

* * * * *